United States Patent [19]
Harrington et al.

[11] Patent Number: 5,682,249
[45] Date of Patent: Oct. 28, 1997

[54] METHOD OF ENCODING AN IMAGE AT FULL RESOLUTION FOR STORING IN A REDUCED IMAGE BUFFER

[75] Inventors: Steven J. Harrington, Holley; R. Victor Klassen, Webster, both of N.Y.

[73] Assignee: Xerox Corporation, Stamford, Conn.

[21] Appl. No.: 439,266

[22] Filed: May 11, 1995

[51] Int. Cl.$^6$ ...................................................... H04N 7/13
[52] U.S. Cl. ............................ 358/433; 358/426; 395/109
[58] Field of Search ..................................... 358/539, 426, 358/429, 432, 433; 395/114–116, 109, 102

[56] References Cited

U.S. PATENT DOCUMENTS

| | | | |
|---|---|---|---|
| 4,618,990 | 10/1986 | Sieb, Jr. et al. | 382/43 |
| 4,682,869 | 7/1987 | Itoh et al. | 358/260 |
| 4,703,363 | 10/1987 | Kitamura | 358/284 |
| 4,782,399 | 11/1988 | Sato | 358/280 |
| 4,959,868 | 9/1990 | Tanioka | 382/41 |
| 5,237,397 | 8/1993 | Mighdoll et al. | 358/426 |
| 5,276,532 | 1/1994 | Harrington | 358/444 |
| 5,408,542 | 4/1995 | Callahan | 358/426 |
| 5,539,865 | 7/1996 | Gentile | 395/115 |
| 5,544,290 | 8/1996 | Gentile | 395/115 |

*Primary Examiner*—Edward L. Coles, Sr.
*Assistant Examiner*—Stephen Brinich
*Attorney, Agent, or Firm*—Lloyd F. Bean, II

[57] ABSTRACT

A method of encoding an image at full resolution for storing in a reduced image buffer for subsequent decoding and printing by a marking device, the method including the steps of dividing the image into a plurality of blocks wherein each block is comprised of a plurality of pixels. The step of identifying a number of color regions present in each of the plurality of blocks. The step of selecting a predefined encoding process from a plurality of predefined encoding processes for each of the plurality of blocks according to the number of color regions present in each of the plurality of block. And, the step of storing the encoded plurality of blocks in the reduced image buffer for subsequent decoding and printing by the marking device.

26 Claims, 14 Drawing Sheets

| TAG | YELLOW VALUE | MAGENTA VALUE | CYAN VALUE | BLACK VALUE |

| TAG | RED VALUE | GREEN VALUE | BLUE VALUE |

METHOD OF ENCODING AN IMAGE AT FULL RESOLUTION FOR STORING IN A REDUCED IMAGE BUFFER

FIELD OF THE INVENTION

The invention relates generally to image processing and more specifically to a block truncation coding image compression technique that allows image compression which can improve the quality of a compressed image, particularly for high-contrast edges, without significant increases in the storage requirements.

INCORPORATION BY REFERENCE

The following are specifically incorporated by reference for their background teachings, and specific teachings U.S. application Ser. No. (D/93312Q1) entitled "A METHOD FOR SELECTING AN OPTIMUM ENCODING PROCESS FOR A BLOCK OF PIXELS FROM A PLURALITY OF PREDEFINED ENCODING PROCESSES" filed concurrently therewith. U.S. application Ser. No. (D/93312Q) entitled "A METHOD FOR DECODING A COMPRESSED IMAGE" filed concurrently therewith.

BACKGROUND OF THE INVENTION

The quality or acceptability of a color print is a function of how the human eye and mind receives and perceives the colors of the original or source image and compares it to the colors of the print. The human eye has three color receptors that sense red light, green light, and blue light. These colors are known as the three primary colors of light. These colors can be reproduced by one of two methods, additive color mixing and subtractive color mixing, depending on the way the colored object emits or reflects light.

In the method of additive color mixing, light of the three primary colors is projected onto a white screen and mixed together to create various colors. A well known exemplary device that uses the additive color method is the color television. In the subtractive color method, colors are created from the three colors yellow, magenta and cyan, that are complementary to the three primary colors. The method involves progressively subtracting light from white light. Examples of subtractive color mixing are color photography and color printing.

Modern electronic printers are capable of producing quite complex and interesting page images. The pages may include text, graphics, and scanned or computer-generated images. The image of a page is described as a collection of simple image components or primitives (characters, lines, bitmaps, colors). Complex pages can then be built by specifying a large number of the basic image primitives. This is done by a page description language such as PostScript. The job of the electronic printer's software is to receive, interpret and draw each of the imaging primitives for the page. The drawing, or rasterization must be done on an internal, electronic model of the page. All image components must be collected and the final page image must be assembled before marking can begin. This electronic model of the page is often constructed in a data structure called an image buffer. The data contained is in the form of an array of color values called pixels. Each pixel corresponds to a spot which can be marked on the actual page and the pixel's value gives the color that should be used when marking. The pixels are organized to reflect the geometric relation of their corresponding spots. They are usually ordered such as to provide easy access in the raster pattern required for marking.

In generating color pictorial images, a large number of colors and moderate spatial resolution are generally required to achieve a high-quality image. Because the eye can detect approximately 100 intensity levels, i.e., for three color separations, seven bits per color separation per pixel, imaging systems should support at least this number of intensity levels. Generally, however, imaging systems support 256 different intensity levels. The 256 intensity levels supported by an imaging system performing three color separations for a full-color image correspond to eight bits per color separation, i.e., twenty-four bits per pixel. For high-quality renditions of real-life scenes, an imaging system supporting at least 100 intensity levels detectable by the eye requires less than 200 pixels per inch to achieve an image having a sufficient level of spatial resolution.

When material such as textual material and synthetic graphic material is being imaged, the accuracy of color is not nearly so important achieve a high-quality image, particularly since the color used is generally a (constant black). High spatial resolution is, however, needed to provide images having crisp, clear edges.

A desirable imaging system would support high-quality color pictorial images, synthetic graphic material and textual material. Heretofore, such an imaging system would necessarily have both a large color space, i.e., many bits per pixel, and a high-resolution level, i.e., many pixels, thus resulting in requirements for extensive memory capability and high bandwidth.

It is highly desirable for an imaging system to reduce the amount of memory required to construct a full color page image for printing and maintain quality or acceptability of the color print. Architectures for high-quality color printing require construction of a continuous-tone page image prior to marking. However, the cost of a continuous-tone image buffer can be troubling in cases of high quality printers which require very high resolutions or in cases of low-end printers where cost considerations dominate. In these cases it is desirable to construct the page image in a compressed form. Current techniques can do this by collecting and sorting compressed representations of the image primitives and then assembling each scan line when marking, but cannot guarantee that a complex page can be stored or printed. U.S. Pat. No. 5,276,532 to Harrington discloses a method to reduce the amount of memory required to construct a full color page image for printing. A single, split-level frame buffer used in a color imaging system includes a plurality of pixels having a first resolution level. A plurality of bits are provided for each pixel so as to enable accurate pictorial imaging. The frame buffer includes pixels having a resolution level which is higher than the first resolution level. Pixels on the edges of objects being imaged are replaced by the higher resolution pixels to provide images wherein object edges have high-resolution while object interiors have moderate resolution. In using a single frame buffer, images having more than one level of resolution are generated which do not require separation and merging operations. This patent is herein incorporated by reference. U.S. patent application No. 08/083,581 to Harrington discloses a method and apparatus for achieving an ultra-small or compressed image buffer that images at half the resolution and then scales by two to achieve the device resolution. Acceptable quality can be maintained by identifying edge and interior portions of the page image and using this information to scale intelligently. A split-level frame buffer provides this identification of the image components. This patent application is herein incorporated by reference.

The amount of memory can be further reduced by using block truncation. (Block truncation) coding which is a well known technique for compressing gray scale images. This technique divides the image into nonoverlapping 4×4 pixel cells. Each cell is then analyzed to determine the two most representative gray levels or shades. The cell is then approximated by one which contains pixels at only those two gray levels. The cell can be encoded as the two gray levels (or the average of the two shades and their deviation from this mean) and a 4×4 element bit map that indicates which gray level is assigned to each pixel. This compression technique can reduce image data from 8 bits per pixel to 2 bits per pixel or less. However, the method suffers from problems at high contrast edges. The technique will force the pixels along the edge into the two contrasting shades yielding a sharp distinction along the pixel boundaries resulting in an artificially sharp jagged edge.

Another technique is to use three shades for the block, the two representative shades and their average is then used for pixels on the boundary between the two high-contrast regions. But this approach implies that there are now three possible shades for each pixel in the block and a simple bitmap is no longer adequate for specifying the pixel shades. This technique solves this subproblem by building a small table of representative three-shade patterns and mapping the actual block structure into the closest matching table entry. The block is then encoded as the two representative shades and the table index. This approach of using a table of representative patterns entails further approximation and degradation of the image results.

A simple, relatively inexpensive, and accurate imaging system is desired which has the capability for encoding a color image which provides an exact specification of the colors within the image. It is also desirable for an imaging system to generate high-quality images without significantly increasing the complexity of the system.

Various techniques for processing images have hereinbefore been devised as illustrated by the following disclosures, which may be relevant to certain aspects of the present invention:

U.S. Pat. No. 4,782,399 to Sato, discloses an image processing apparatus having image input systems for input of image data of high and low-resolution. A processor discriminates an edge block in the image data, and a filter performs edge detection of an output from a low-resolution image input system. A signal selection circuit selects a signal from high-resolution and low-resolution image input systems and produces the selected signal as an output signal so as to reproduce optimum quality images for all types of original images including character and half tone images. The Sato apparatus thus processes the high resolution and low resolution image data differently. The Sato apparatus, accordingly, is complex in operation.

U.S. Pat. No. 4,703,363 to Kitamura discloses an apparatus for smoothing jagged border lines of an image by providing weight coefficients to a center pixel and surrounding pixels. Values are then obtained for designating middle level densities to be used for the smoothing in accordance with the sum of the coefficients. The apparatus does not provide an imaging system which supports pictorial material, synthetic graphic material and textual material without requiring extensive memory capability and high bandwidth.

U.S. Pat. No. 4,618,990 to Sieb, Jr., et al. discloses a method of edge enhancement of digitized fluorographic images by defining frequency components to be enhanced to sharpen images. The frequency components correspond to the frequency response of the edge enhancement filter. An edge map results which corresponds to frequency components at edges which are added to corresponding pixels in the original image, resulting in sharpened edges. The method disclosed by the reference thus requires independent processing at edges and subsequent addition of a resultant edge map in the original image.

U.S. Pat. No. 4,682,869 to Itoh et al discloses an image processing system allowing communication with input and output devices having varying resolutions by converting input images into images having any desired level of resolution up to that of the input. The system thus requires a plurality of devices having varying resolutions to achieve a desired level of resolution in a resultant image.

SUMMARY OF THE INVENTION

In accordance with the invention there is provided a method of encoding an image at full resolution for storing in a reduced image buffer for subsequent decoding and printing by a marking device, the method including the steps of dividing the image into a plurality of blocks wherein each block is comprised of a plurality of pixels. The step of identifying a number of color regions present in each of the plurality of blocks. The step of selecting a predefined encoding process from a plurality of predefined encoding processes for each of the plurality of blocks according to the number of color regions present in each of the plurality of block. And, the step of storing the encoded plurality of blocks in the reduced image buffer for subsequent decoding and printing by the marking device.

These and other aspects of the invention will become apparent from the following description used to illustrate a preferred embodiment of the invention read in conjunction with the accompanying drawings.

While the present invention is described primarily in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

DESCRIPTION OF THE PREFERRED EMBODIMENT

Figure 21:
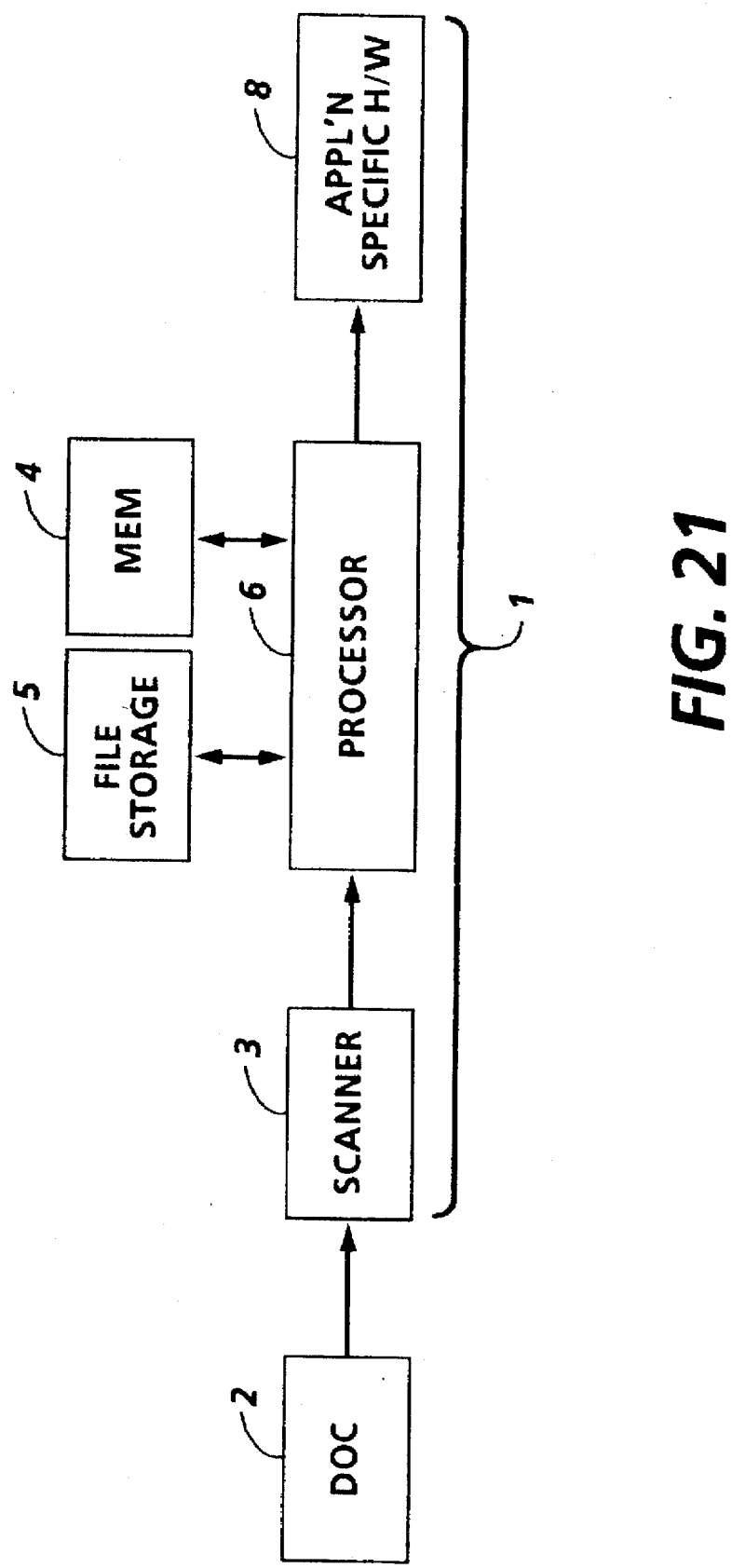
FIG. 21 is a block diagram of an image scanning and processing system incorporating the present invention.

FIG. 21 is a block diagram of an image analysis system 1 within which the present invention may be embodied. The basic operation of system 1 is to extract or eliminate certain characteristic portions of document 2. To this end, the system includes a scanner 3 which digitizes the document on a pixel basis, and provides a resultant data structure, typically referred to as an image. Depending on the application, the scanner provides a gray scale image (a plurality of bits per pixel). The image contains the raw content of the document, to the precision of the resolution of the scanner. The image may be sent to a memory 4 or stored as a file in a file storage unit 5, which may be a disk or other mass storage device.

A processor 6 controls the data flow and performs the image processing, including for example, the encoding and decoding processing of the present invention. Processor 6 may be a general purpose computer, a special purpose computer optimized for image processing operations, or a combination of a general purpose computer and auxiliary special purpose hardware. If a file storage unit is used, the image is transferred to memory 4 prior to processing. Memory 4 may also be used to store intermediate data structures and possibly a final processed data structure.

The result of the image processing, of which the present invention forms a part, can be a derived image, numerical data (such as coordinates of salient features of the image) or a combination. This information may be communicated to application specific hardware 8, which may be a printer or display, or may be written back to file storage unit 5.

The foregoing description should be sufficient to illustrate the general operation of an image analysis system.

The features of the present invention will now be discussed in greater detail with reference to the Figures of the drawings.

The present invention employs a split-level image buffer as disclosed in U.S. Pat. No. 5,276,532. The high-resolution level has four times as many samples per inch as the low-resolution level. The low-resolution sampling is used for portions of the page where color changes slowly, if at all. This is often true of the interiors of image components. The high-resolution sampling is used for regions where colors change rapidly as across component edges. The split-level image buffer can be pictured as a grid of low-resolution blocks with some blocks expanded into 4×4 cells of high-resolution pixels (see FIG. 7). When marking occurs, the color value in a low-resolution block can be replicated to give 16 values at the high-resolution. This structuring of the image immediately gives significant compression. The low-resolution blocks specify only a sixteenth as many of color values as the high-resolution blocks.

The high resolution blocks usually contain only two or three colors, separated by one or two edges. Special encodings have been developed for these cases which require no more image buffer storage than the low-resolution block. By using only these encodings, the split-level image buffer can give a guaranteed 16:1 reduction of image buffer storage. When constructing a graphical image, it may be quite likely for all 16 pixels of a block to have exactly the same color, and therefore replacing them with a single low-resolution color value causes no error. But in a sampled pictorial image one may find the 16 high-resolution pixels have almost, but not exactly the same value. Replacing them with a single low-resolution value does cause some error and loss of image information. For the split-level image buffer to work, the errors in using low-resolution pixels must be small enough to go unnoticed.

The split-level image buffer is designed so that each block requires 32 bits of storage. For low-resolution blocks, the 32 bits contain a color value. For blocks which expand to high-resolution, the 32 bits contain one of the encodings described below. Because of this uniform block size, the split-level image buffer looks like a uniform array of blocks. The blocks can be organized according to their geometry and the entire data structure looks like a simple low-resolution image buffer, except that while some pixels contain color values, others contain special encodings which can be expanded into 4×4 cells of high-resolution color values.

The low-resolution encoding is the simplest of the encodings used for the blocks of the split-level image buffer. The 32 bits allocated to a block provide a color value which can be used for all 16 high-resolution pixels of the block.

Colors can be specified in a device independent way using tristimulus based color coordinates such as the CIE l*a*b* or an rgb coordinate system where the red, green, blue axis and white point have been specified. Colors may also be specified by the device-dependent coordinates which specify the amounts of colorant the printer should use. Often this is the amount of cyan, magenta, yellow and black ink or toner (cmyk). An issue in designing a printing architecture is to decide when the conversion from device-independent to device-dependent coordinates should take place. One must decide which coordinate form should be stored in the image buffer. Using device-dependent coordinates can give the document creator complete control over the colors. At times this can be useful, such as when printing calibration patterns. Early conversion to this form also reduces the amount of work needed when marking and makes it easier to support high performance printers. However, early conversion to device-dependent coordinates disallows image dependent gamut mapping. Furthermore, since device coordinates rarely have the well defined, often linear, behavior of device independent coordinates, they rule out operations on colors such as color mixing and shading.

The present invention side-steps the color coordinate decision by supporting both device-independent and device-dependent formats. If a color arrives at the image buffer already in the device coordinates, it is stored and is used unchanged when marking. If a color arrives in one of the device-independent coordinate formats, it will be converted (if needed) to a single, canonical internal device-independent system and stored in the image buffer. After the page is complete, but before marking, the color will be converted to device-dependent coordinates.

Figures 7, 8, 9:
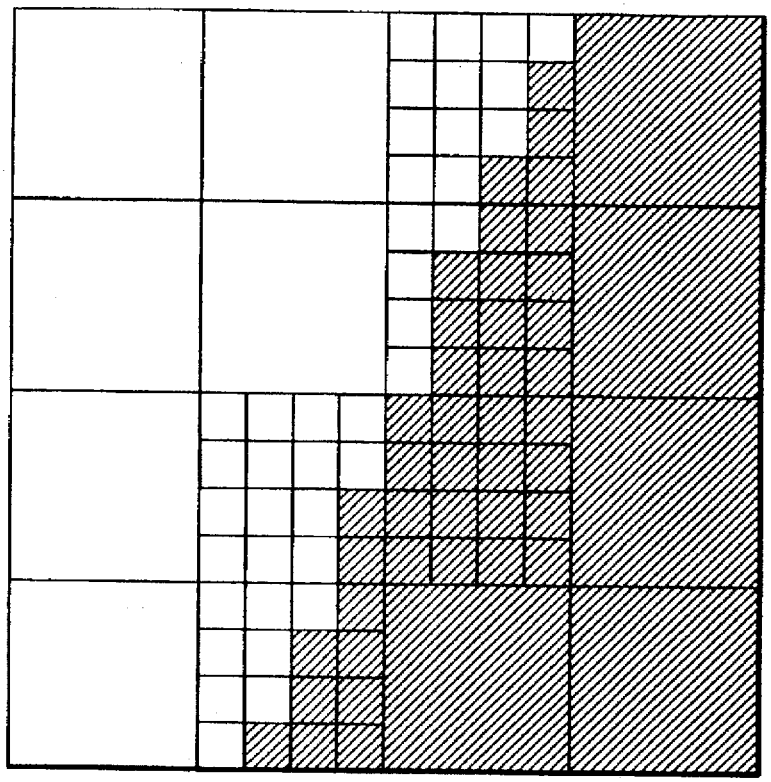
FIG. 7 is a graphical illustration of a split level image buffer.
FIG. 8 is a representation of single device dependent color encoding.
FIG. 9 is a representation of single device independent color encoding.

The device-dependent encoding uses 31 of the 32 bits to specify the color (see FIG. 8). The remaining bit is used as a tag to distinguish this color specification from the other encodings. The present invention allocates eight bits to each of the cyan, magenta, and black specifications and seven bits to the yellow. The tag bit was taken from the yellow since the eye is least sensitive to the blue light absorbed by the yellow ink. In the case of device-independent color (FIG. 9), eight bits are used for the tag and eight bits are allocated to each of the three color coordinates (e.g.: red, green and blue).

Full-cluster Encoding

Figure 10:
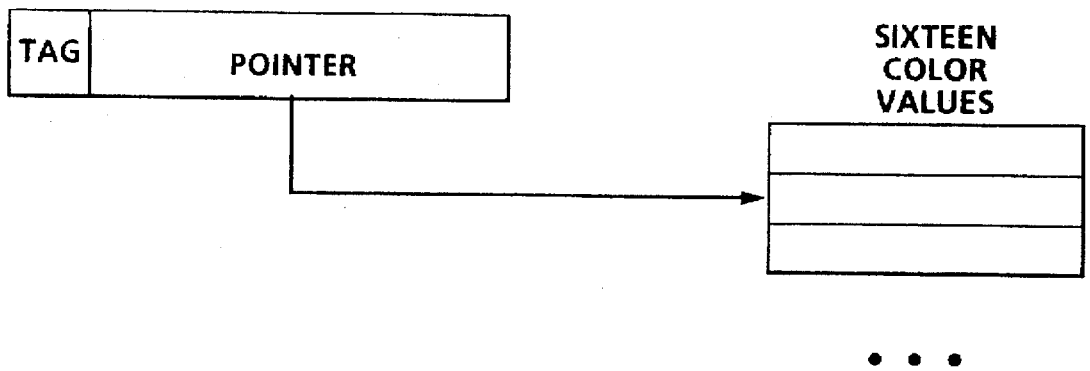
FIG. 10 is a graphical illustration for full-cluster encoding.
Figure 10:
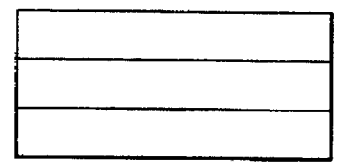

The most straight forward approach to handling the expanded high-resolution block is to specify the color for each of the sixteen pixels. This requires at least sixteen 32-bit words instead of the single 32-bit word available in the image buffer. This expansion can be managed by storing in the image-buffer word a pointer to a list of the sixteen colors for the block (see FIG. 10). This is called the full-cluster encoding. Its use requires the allocation of storage beyond the image buffer in order to hold the sixteen-color list. This makes the encoding expensive to use. Fortunately, most high-resolution blocks do not require sixteen different colors, but only two. This means that the more economical encodings described below can be used instead of the full-cluster encoding. In fact, the full-cluster encoding can be eliminated completely by always choosing one of the alternate encodings with only a slight loss in image quality.

Two-color Encoding

Figure 11:
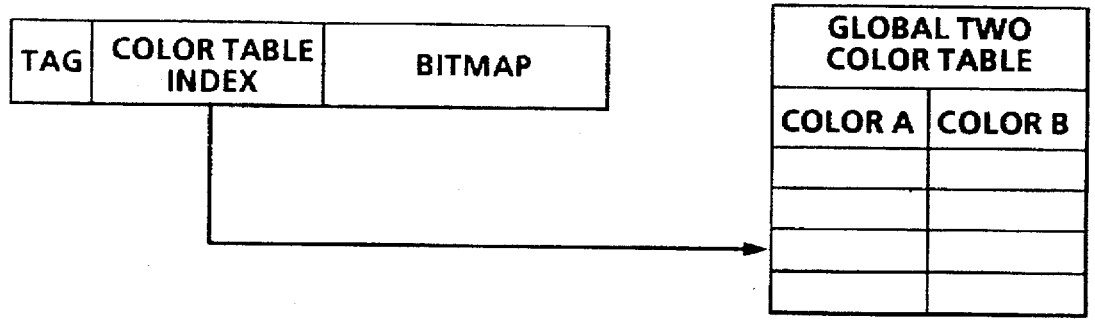
FIG. 11 is a graphical illustration for two-color encoding.

Consider imaging graphical primitives or text. These are typically shapes with clean, well-defined edges, and uniform color interiors. The interiors of these shapes can be handled by the low-resolution encoding, but the edges will require the use of a high-resolution block. However, these blocks will usually only contain two colors, the color of the graphical object or character and the color of the background. A special encoding has been devised for this common case. The encoding must specify which of the two colors (foreground or background) should be used at each pixel. A bitmap (16 bits) indicates which color should be assigned to each high-resolution pixel. The remaining bits serve as a tag to indicate this encoding and as an index into a table which contains the color coordinates of the two colors (see FIG. 11). The range of the index is implementation dependent, and is limited by the fixed size encoding. One possible implementation provides for 16 thousand entries.

The two-color encoding handles almost all the blocks with edges arising from graphics and text. It is also very valuable for the blocks with fine structure found in pictorial images, in fact, typically over half of the high-resolution blocks in pictures can be handled by this encoding. While it is useful for single edges, its bitmap can handle arbitrary configurations of the two colors and can support more complex shapes and textures.

Three-color Encoding

Figure 12:
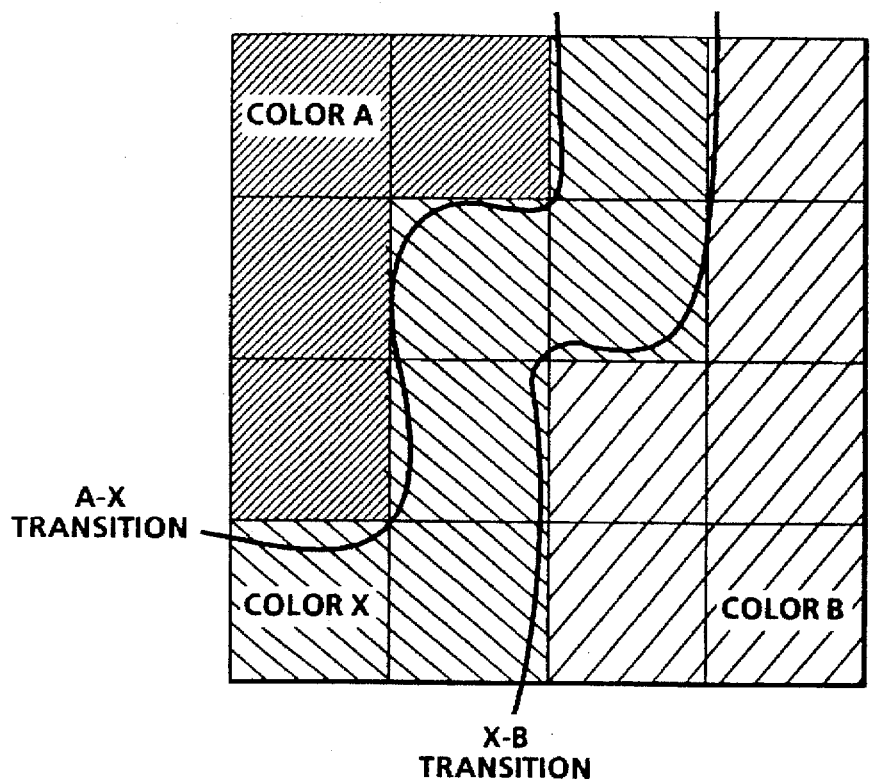
FIG. 12 is a high-resolution block containing three colors.

Occasionally a high-resolution block will contain three-colors. This is rare in pictorial images but can be generated often by a particular style of graphic design. Suppose the page contains colored graphic shapes with black borders. Then at the shape boundary one has three colored regions containing the background color (A), the border color (X) and the object's interior color (B). The present invention's compression scheme provides two encodings for blocks of this type. These encoding compress blocks with three colors where the colors always occur in the same order, first color A then color X and lastly color B (see FIG. 12). One encoding is used when the three colors are ordered along rows, indicating a mostly vertical edge and the other is used when the three colors are ordered along columns, indicating a mostly horizontal edge.

In the mostly vertical case, each row is described by the run length of each of the three colors or equivalently by the transition points between the colors. There are fifteen possible run length combinations. A table of these fifteen patterns can be constructed and a 4-bit index into the table will describe the row (Table 1)

TABLE 1

| INDEX | RUN LENGTH OF LEFT SHADE (M) | RUN LENGTH OF MIDDLE SHADE (N) | RUN LENGTH OF RIGHT SHADE (4-M-N) |
| --- | --- | --- | --- |
| 0 | 0 | 4 | 0 |
| 1 | 0 | 3 | 1 |
| 2 | 0 | 2 | 2 |
| 3 | 0 | 1 | 3 |
| 4 | 0 | 0 | 4 |
| 5 | 1 | 3 | 0 |
| 6 | 1 | 2 | 1 |
| 7 | 1 | 1 | 2 |
| 8 | 1 | 0 | 3 |
| 9 | 2 | 2 | 0 |
| 10 | 2 | 1 | 1 |
| 11 | 2 | 0 | 2 |
| 12 | 3 | 1 | 0 |
| 13 | 3 | 0 | 1 |
| 14 | 4 | 0 | 0 |

Figure 13:
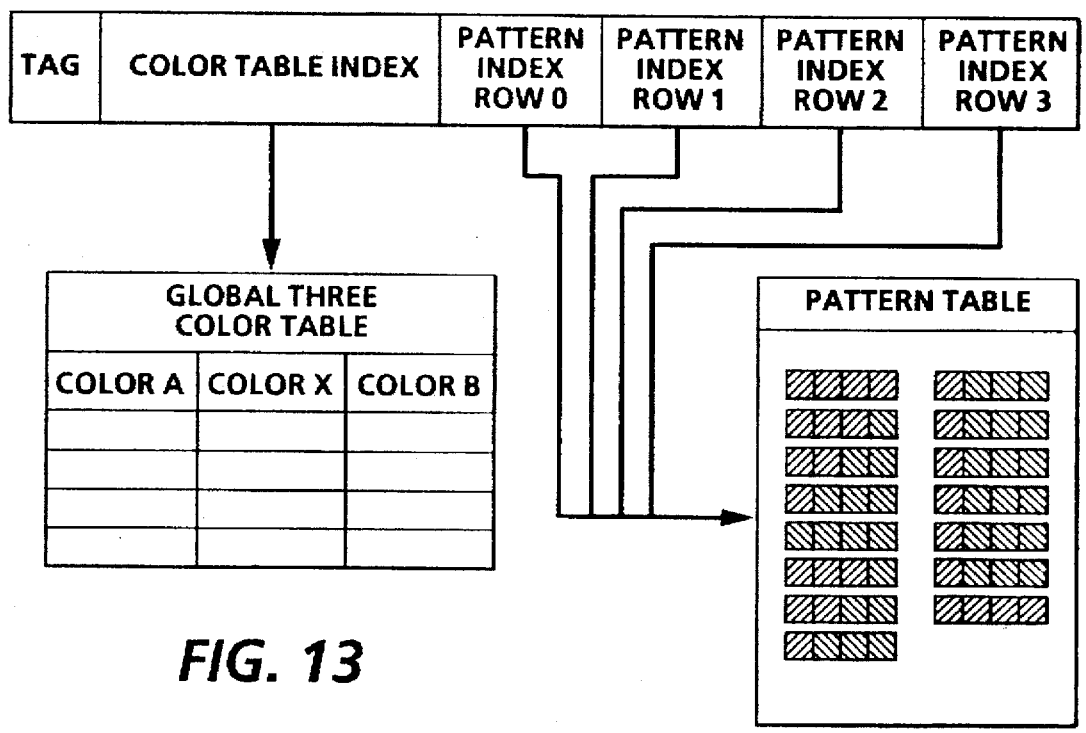
FIG. 13 illustrates the encoding which specifies the three color block.

The encoding uses four 4-bit table indices to specify the configuration of the colors for each row. There is also a tag field and an index into a table which specifies the three colors (FIG. 13). The mostly horizontal case is handled similarly.

Edge Encoding

Figure 14:
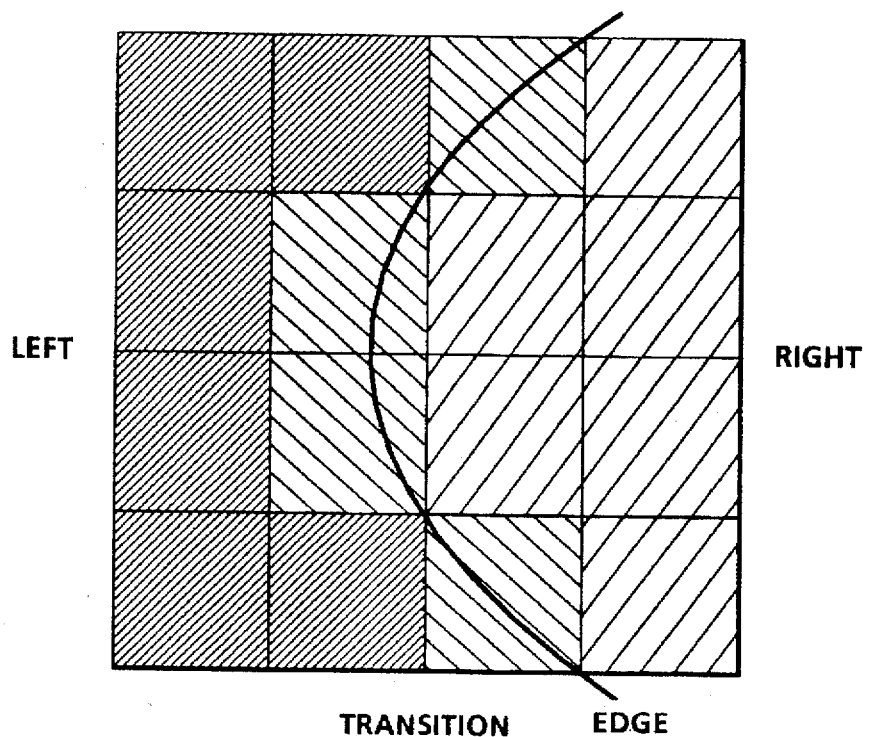
FIG. 14 is a block containing an edge between two regions.

The two-color encoding works fine for the sharply defined edges of graphical objects and text, but a problem can arise when it is applied to the edges in a scanned image. The problem is that the scanner does not always see sharp edges, but rather can report an intermediate color value as its aperture moves across the edge. If this intermediate value is then forced back into one of two colors so as to use the two-color encoding, the edges appear too rough and jagged. To correct this, a further encoding is introduced. This encoding describes a block containing the boundary or edge between two regions. There are actually two variations of this encoding, one for mostly vertical edges and one for mostly horizontal edges. Consider first the case of a mostly vertical edge. A row of pixels from the block can be segregated into three areas (see FIG. 14). There is the pixel through which the edge passes (the transition pixel), the pixels to its left and those to its right. The pixels to the left will have the color of the region to the left. Those to the right will have the color of the region on the right. The transition pixel will have some intermediate color depending upon where the edge falls within this pixel. If the edge were to fall three-quarters of the way towards the right of the transition pixel, for example, its color should be composed of ¾ of the left color and ¼ of the right color. In general, if Z is the fraction of the pixel to the left of the edge then the pixel color is Z (color A)+(1−Z)(color B) where color A is the color on the left and color B the color on the right.

Figure 15:
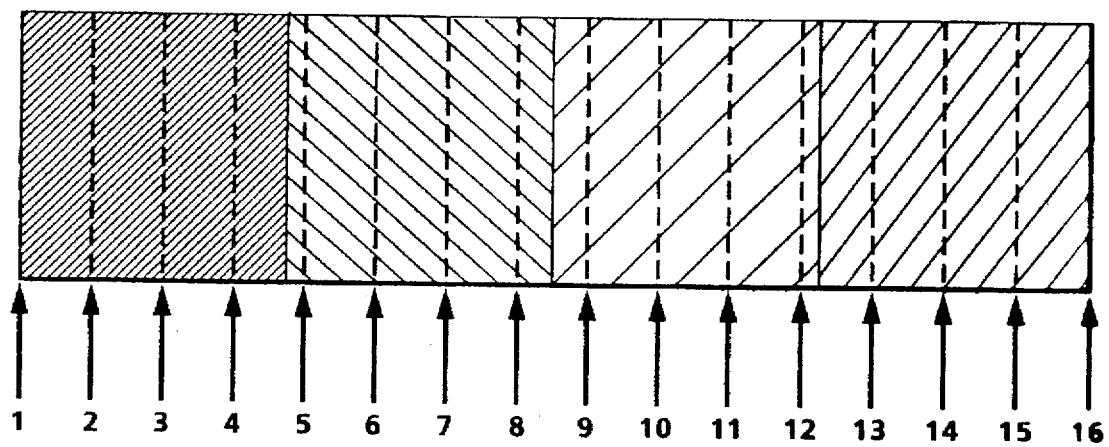
FIG. 15 illustrates the sixteen positions in a row of four pixels.

To encode the row of the block one must describe where the edge lies. Allocating four bits to this description allows placement of the edge at any one of 16 positions (see FIG. 15). Since an edge may miss a row entirely it is necessary that the encoding have two of these positions at the extreme ends of the row. A uniform distribution of the 14 intermediate edge positions will not be aligned with the pixel boundaries within the row. While this may seem inconvenient, it is not a hardship since a simple table look-up can provide both the pixel and color proportions corresponding to an edge position (Table 2).

TABLE 2

| POSITION | PIXEL | Z |
| --- | --- | --- |
| 0 | 0 | 0 |
| 1 | 0 | 4/15 |
| 2 | 0 | 8/15 |
| 3 | 0 | 12/15 |
| 4 | 1 | 1/15 |
| 5 | 1 | 5/15 |
| 6 | 1 | 9/15 |
| 7 | 1 | 13/15 |
| 8 | 2 | 2/15 |
| 9 | 2 | 6/15 |
| 10 | 2 | 10/15 |
| 11 | 2 | 14/15 |
| 12 | 3 | 3/15 |
| 13 | 3 | 7/15 |
| 14 | 3 | 11/15 |
| 15 | 3 | 1 |

Figure 16:
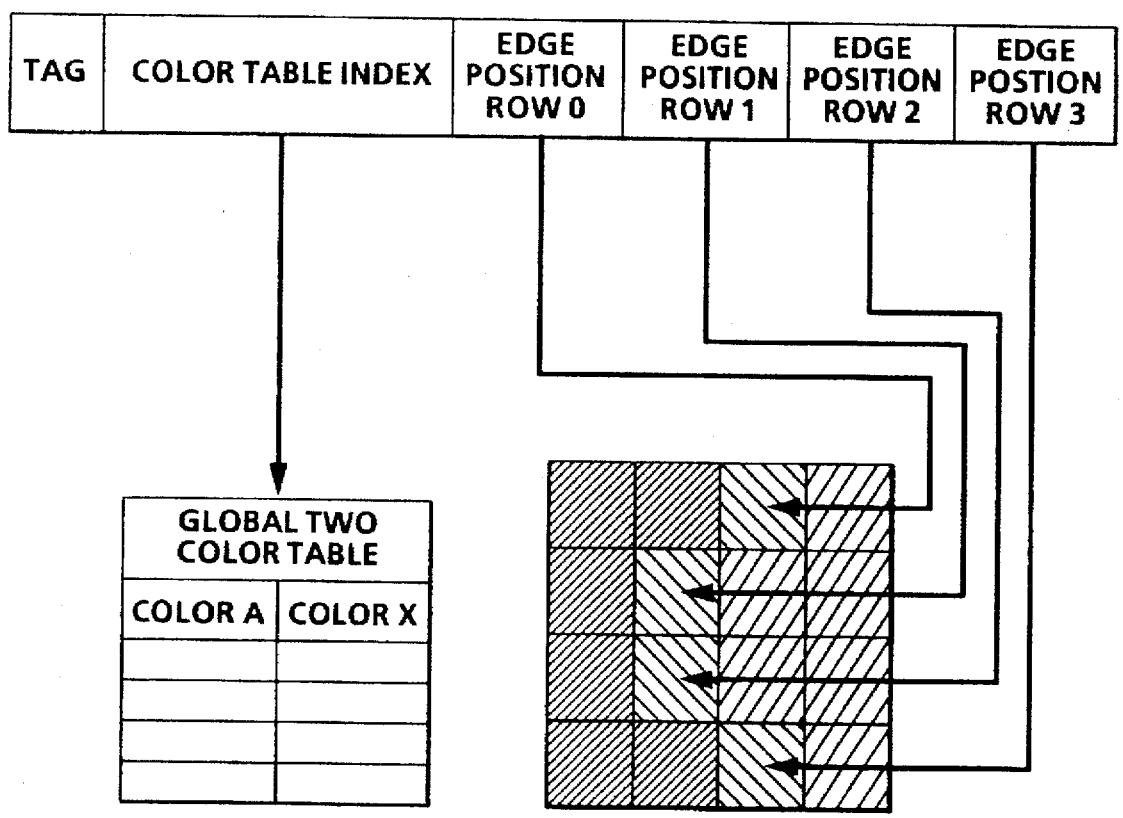
FIG. 16 illustrates the encoding which specifies a block containing two regions with an edge.

The edge encoding for mostly vertical edges has four 4-bit codes which give the effective edge position in each of the four rows of the block (see FIG. 16). It also has a tag to indicate the encoding type and a color table index that points to an entry in a table of color pairs. This table can be the same one used for the two-color encoding.

The mostly-horizontal edge encoding looks the same, only the four 4-bit codes give the effective positions of the edge within the columns of the block (instead of the rows).

Color Look-up Tables

The compact encodings of high-resolution blocks make use of color tables to indicate pairs or triplets of colors. The use of these tables allows a small, uniform-size (32-bit) entry in the image buffer proper. It provides data compression by using only a single color pair specification when that pair occurs many places within the image. It can also provide some performance improvement in the operations on colors since these operations can be applied to the few entries in the color table rather than the possibly large number of places where the color pairs occur in the image buffer.

There are three main issues relating to color tables in the present invention. One is that almost every pixel operation involves entering a (possible new) color into a color table, thus the data structure which supports the color table must have efficient look-up and insertion capability. The second concern is that since there is limited space for the color index field in the pixel encodings, there is a limit to the number of colors that can be stored in the table. Some kind of color quantization is required to prevent color table overflow. It is desirable that the data structure supports this color quantization. The third concern is the space required for the table.

In the foregoing discussion several encodings have been presented, each requiring some tag to identify it. In this section the specification of the tags and color-table index space is discussed in greater detail. The descriptions of the encodings have shown the tags as specific bit patterns, and one is certainly free to implement them in this manner. Table 3 shows a possible allocation of tags and data for the various encodings, where C indicates a bit of actual color specification, S is a bit of shape data, X is a bit of color-table index, and P is a bit of pointer data for a full cluster.

Note firstly that the available color-table index space varies between encodings. The two-color encoding has 14-bit color-table indices, or 16K possible entries, while the three-color encodings have only 11-bit indices or 2K possible entries. Since some encodings are used much more often than others, it makes sense to provide them with larger color tables.

Note also that the 5-bit tag for the three-color horizontal encoding overlaps the 8-bit tags for full-cluster and single-internal-color encodings. This means that any word beginning with five 1's is a three-color

TABLE 3

| single device color | 0CCCCCCC | CCCCCCCC | CCCCCCC | CCCCCCCC |
| --- | --- | --- | --- | --- |
| two-color | 10XXXXXX | XXXXXXXX | SSSSSSSS | SSSSSSSS |
| vertical edge | 110XXXXX | XXXXXXXX | SSSSSSSS | SSSSSSSS |
| horizontal edge | 1110XXXX | XXXXXXXX | SSSSSSSS | SSSSSSSS |
| three-color vertical | 11110XXX | XXXXXXXX | SSSSSSSS | SSSSSSSS |
| three-color horizontal | 11111XXX | XXXXXXXX | SSSSSSSS | SSSSSSSS |
| full cluster | 11111110 | PPPPPPPP | PPPPPPPP | PPPPPPPP |
| single internal color | 11111111 | CCCCCCCC | CCCCCCCC | CCCCCCCC | color horizontal coded block except for these two cases. In the implementation it means one should check the two special cases first, and if the word does not match either of them, then consider whether it matches the three-color horizontal tag.

The use of fixed tag fields as shown in table 3 allows simple decoding of the block type; however, it is not very flexible in that it restricts tables sizes to certain powers of 2. It may be that this does not yield an ideal match to the table-size properties and requirements of typical documents. A more flexible approach is possible. In the alternative scheme the tag and color-table index are combined so that the range of the codes serves as the tag, and subtracting the first code of the range recovers the color-table index. Consider the encodings that require a color-table index. These all use sixteen bits to describe the shape information leaving the remaining sixteen bits for tag and color index. If one bit is used to distinguish the low-resolution device-color case, then that leaves fifteen bits of address space to apportion between the remaining encodings for use as color-table indices. This address space can be divided quite arbitrarily (not just into portions with size a power of 2). All that is required is to know the starting and ending address assigned to each encoding. One can still determine which encoding is being used, but instead of a simple check for bit fields, one must compare the index against the ranges assigned to the encodings and determine in which range it lies. This scheme gives greater flexibility in the table sizes at the expense of a little more work when decoding blocks.

An example may make this clearer. In the fixed tag field scheme described above, the hexadecimal values of the blocks with the two-color encoding ranged from 8000000 to BFFFFFFF, the vertical-edge encoding from C000000 to DFFFFFFF and the horizontal-edge from E0000000 to EFFFFFFF. This gave 16384 entries for the two-color table, 8192 entries for the vertical-edge table and 4096 entries for the horizontal-edge table. Suppose that instead one wished 20000 entries for the two-color table, 6000 for the vertical-edge table and 6000 for the horizontal-edge table. In this case the two-color encodings would range from 80000000 to CE1FFFFF. The vertical-edge indices would range from CE200000 to E58FFFFF, the horizontal-edge indices would range from E5900000 to FCFFFFFF, and the remaining three-color table ranges would also need to be adjusted. With this assignment one cannot just look at the bits of a tag field to determine which encoding is used, but one can tell if the code is in the range CE200000 to E58FFFFF, and if so, one knows that it is a horizontal-edge block. The color table index can then be obtained by subtracting the starting value for this range.

Stepping and Filling

The following is a discussion of how objects are entered into the split-level image buffer and how the various encodings are selected. The entry of graphical objects (e.g. polygons) is considered first. These objects are defined by boundaries or edges which are (or can be approximated by) a series of line segments. Stepping algorithms determine which pixels correspond to a line segment, and filling algorithms determine which pixels are inside of the region defined by the boundary pixels.

Figures 17, 18:
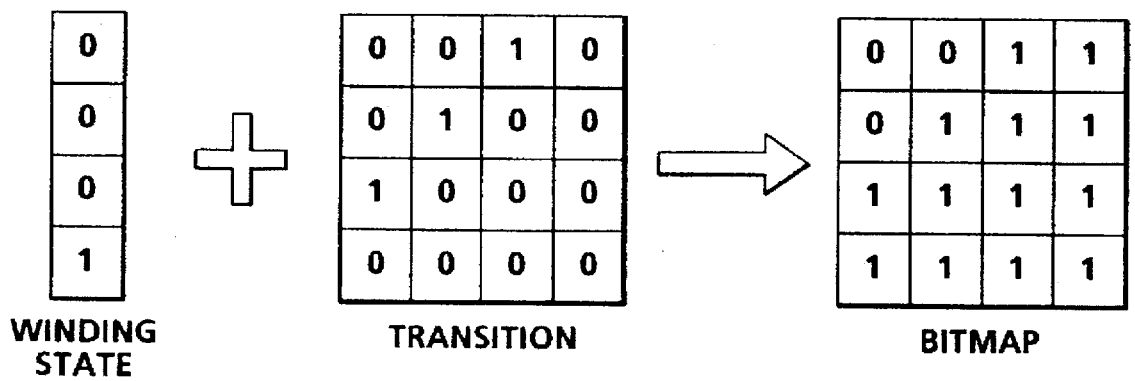
FIG. 17 is a transition pattern for an edge.
FIG. 18 is an illustration for determining the bitmap for an edge.
Figure 19:
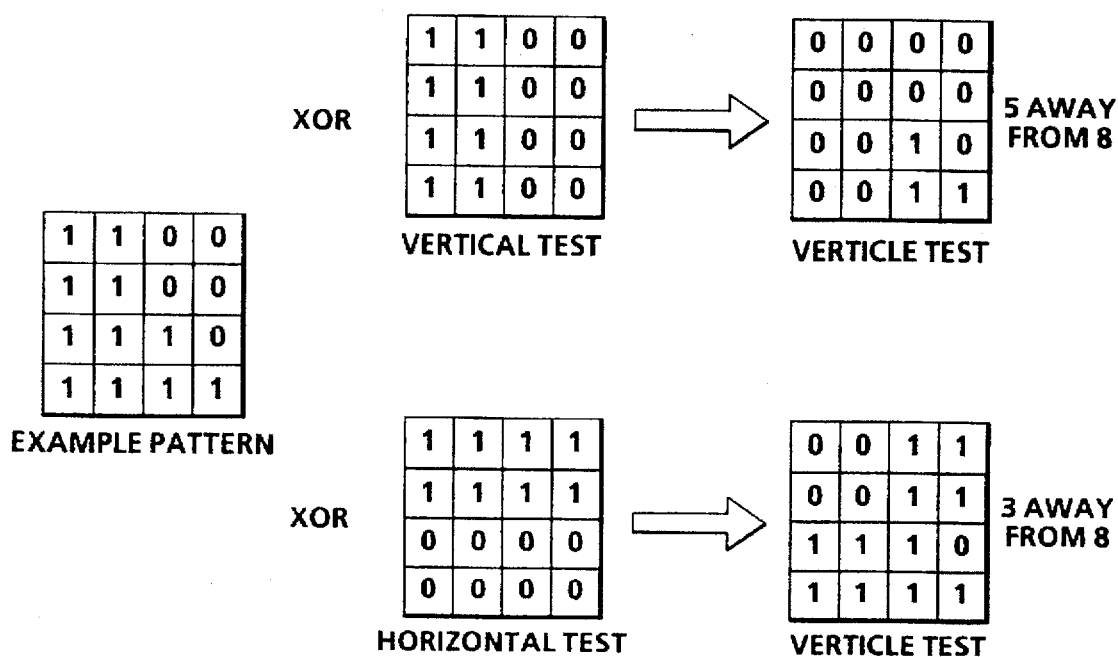
FIG. 19 is an illustration for testing to edge direction.
Figure 20:
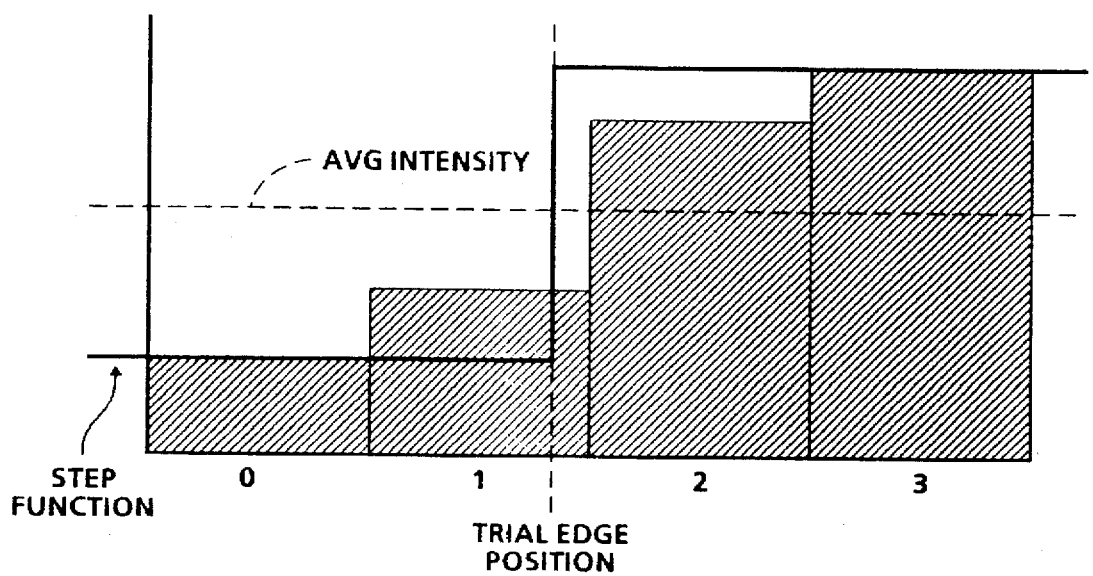
FIG. 20 is an illustration for finding the edge position.

The present invention uses line stepping and polygon fill-in methods which are designed to match the two-color encoding. The line stepper steps at the low-resolution (from block to block) thus the stepper takes only a quarter of the steps needed by a conventional stepping algorithm. The stepper determines where the line enters and leaves each block. These entrance and exit points are used to access a precomputed bit pattern for the edge. This pattern specifies at which pixels there is a transition between foreground and background colors due to the edge. All the edge patterns generated by the stepper for a polygon are collected and sorted into scanning order. The filling procedure can step through this list of edge patterns and determine which blocks have edges and which belong to the object's interior. For interior blocks, the low-resolution encoding is used to store the object's color. For blocks containing edges, the bitmap for the edges is determined from the transition patterns supplied by the stepper (see FIG. 17) and the current winding state (the winding numbers for each scan) just before the block (see FIG. 18).

This is the pattern which will be needed if a two-color encoding can be used. The two-color encoding is appropriate if the previous block value was a low-resolution code. In this case, the two colors will be the previous low-resolution value and the object's color. The two-color encoding can also be used when the target block contains a two-color pixel provided that the new object completely covers one of the two previous colors. This can be determined by logical operations between the block's original bitmap and the bitmap for the new object. This situation occurs when the two graphical objects abut. If neither situation occurs, then one cannot use the two-color encoding without introducing an error. In this case, one can construct a full-cluster block or select the best match of all the available encodings using the same methods as described below for pictorials.

Processing Pictorials

Entry of graphical objects follows from the stepping method which produces the bitmaps needed for the two-color encodings; however, the entry of pictorial images is more difficult. In the pictorial case, one is given each high-resolution block of colors and the problem is to find the compact encoding that is the best match.

The first step in the analysis process is the identification of the two extremely opposed colors. This serves two purposes: firstly, it provides a measure of how divergent the color values are, and secondly, it provides two poles for use in forming two clusters of colors. A simple algorithm is used to locate the two most distant colors and requires a single pass through all colors of the block. It is described as follows:

Select the first two colors of the block as an initial guess at the two most distant colors, call them $C_a$ and $C_b$.

For each of the remaining colors, calculate a distance measure between the color being considered, $C_i$, and both of the two current extreme colors $C_a$ and $C_b$. If the distance between the color $C_j$ and $C_k$ is called $d_{jk}$, then find the largest of $d_{ia}$ and $d_{ib}$ (the largest distance to the trial color) and compare it to $d_{ab}$ (the current extreme distance). If $d_{ia}$ is largest and greater than $d_{ab}$ then replace extreme color $C_b$ with $C_i$. If $d_{ib}$ is largest and greater than $d_{ab}$ then replace $C_a$ with $C_i$ as a current extreme color.

This algorithm is not guaranteed to find the absolute extreme colors but it does a good job and effectively produces the measures needed for the analysis using a single pass through the color values. The method requires 31 color distance measure calculations. A number of possible distance measures can be used, including Manhattan distance and the square of the Euclidean distance.

Having determined two extreme colors and the distance between them, one can next compare that distance to a threshold value. If the distance is less than the threshold $(d_{ab}(t_{single})$ the single color encoding can be used. Otherwise, the colors are too dispersed for the single color encoding and one of the other three encodings must be selected.

If the single color encoding is selected one need only determine the color value to complete the compression of the block. Since all colors of the block are judged close enough to be represented by a single color, the simplest approach is to pick one of the pixels from the block and use its color for the entire block. A more accurate approach would be to sum the colors of the block, component wise and calculate an average color for the block. An intermediate approach is to use the average of the two extreme colors for the block.

The second stage of the analysis determines whether the block contains only two colors and intermediate mixtures of them. If additional colors are present this test will rule out the two color and edge encodings. This test requires a second pass through the block computing the color distances between each pixel and the two extreme colors ($d_{ia}$ and $d_{ib}$). The process is described as follows:

For each of the colors in the block ($C_i$) calculate a distance measure between it and each of the two extreme colors ($C_a$, and $C_b$) giving distances $d_{ia}$ and $d_{ib}$.

If $d_{ia}+d_{ib}>d_{ab}+t_{3\text{-}color}$ then assign the color $C_i$ to a third cluster X.

Otherwise if $d_{ia}<d_{ib}$ assign color $C_i$ to cluster A else assign color $C_i$ to cluster B.

After all colors have been processed, if any have been assigned to the third cluster X then the two color and edge encoding are ruled out.

If a color is a mixture of two colors it should lie on the line segment between the two colors (assuming the colors are described in an appropriate linear color space). The test $d_{ia}+d_{ib}>d_{ab}+t_{3\text{-}color}$ determines whether or not a color lies within an ellipsoid surrounding this line segment. The threshold $t_{3\text{-}color}$ describes the "thickness" of the ellipsoid. The test then says that if a color lies outside of the ellipsoid it is too far from the connecting line segment to be considered as composed from the two extreme colors. The block therefore contains at least one unrelated color and the two-color and edge encodings are insufficient.

As each color is classified as belonging to cluster A, B, or X, some additional calculations are performed. A bit corresponding to the pixel position is entered into the appropriate A or B bitmap. For colors belonging to clusters A or B the maximum distance to the extreme color Max $d_{ia}$ and Max $d_{ib}$ are found. Also a running sum of the color coordinates and a count of the entries is made so that average color values for clusters A, B, and X may be calculated when the pass is complete.

If all colors were allocated to either the A or B cluster then either the two-color or edge encoding will be used. The next step is to examine the maximum distances of colors within the clusters from the extreme colors.

If Max $d_{ia} < t_{2\text{-}color}$ and Max $d_{ib} < t_{2\text{-}color}$ then the two-color encoding can be used.

This test checks for the absence of color mixtures. If all the pixels are clustered about the two extreme colors then the block only contains two colors and the two-color encoding is appropriate.

To form the two color encoding one must complete the calculations of the average colors for the two clusters. One must then do a search/insert of this pair of colors in the color table. The color table search will return an index to the color table for the color pair. This together with the bitmap for cluster A forms the compressed representation of the block.

If there are color mixtures the edge encoding may be used provided that the geometric configuration of the colors is consistent with an edge.

The first step in checking the geometry of the block is to classify it as a horizontal or a vertical edge. To do this take the bitmap for the A cluster, exclusive-or it with two patterns and count the number of 1 bits resulting in each case. The result which is furthest from 8 determines whether the block is mostly vertical or horizontal.

The next step is to determine if all the pixels of cluster A are on one side of the block and those for cluster B are on the other side. This is the geometric configuration required for the edge encoding. If, for example, the block was classified as having a mostly vertical edge then one would expect the pixels of one cluster to lie on the left and those of the other cluster to be on the right. Table look-ups can be used to determine if the bitmaps satisfy this condition. Checking two rows (or columns) at a time is possible using a table size of 256 entries. Then only two table look-ups are needed. Alternatively one might check each row or column individually and make four checks to complete the test. This approach will be used in the following discussion since it limits the size of the example table to 16 elements. Table 4 shows how to check a single row of a bitmap

TABLE 4

| ROW PATTERN | LEFT REGION | RIGHT REGION |
|---|---|---|
| 0 | Yes | Yes |
| 1 | No | Yes |
| 2 | No | No |
| 3 | No | Yes |
| 4 | No | No |
| 5 | No | No |
| 6 | No | No |
| 7 | No | Yes |
| 8 | Yes | No |
| 9 | No | No |
| 10 | No | No |
| 11 | No | No |
| 12 | Yes | No |
| 13 | No | No |
| 14 | Yes | No |
| 15 | Yes | Yes | to determine if it might be the left region or the right region of a mostly vertical edge. If all rows of the bitmap for one cluster satisfy the left region requirements and all rows of the other cluster's bitmap satisfy the right region requirements, then the block is confirmed as containing a mostly vertical edge and the edge encoding will be used.

Similar tests on the columns of the block tell whether it qualifies as truly containing a mostly horizontal edge.

If the geometric tests fail then the block has intermediate colors but not in an edge configuration; it is not a good fit to either the two-color or edge encoding. In this case one could use the full-cluster encoding, or if strict compaction is desired one can fall back to the two-color encoding. An alternative might be to first classify the intermediate colors as a third cluster and attempt to use the three-color encoding.

If the geometric tests for an edge configuration are satisfied, the edge encoding can be used, and the problem then becomes encoding the block, which entails determining the effective edge position for each row or column. The edge position is determined by integrating the pixel values across the row and fitting the result with a step function. The position of the step is the trial location of the edge. One can simplify this procedure to one dimensional color by assuming that the most varying color component is sufficient for locating the edge position. For a mostly vertical edge, the effective edge positions can be calculated as follows:

Select the color coordinate component that varies most between the extreme colors.

Let $V_{left}$ and $V_{right}$ be the value of the component for the left and right colors respectively.

For each row:

Compute $A_{row}$, the average value of the component for the four pixels in the row.

Compute $P_{row}$, the crossover point from the left color to the right color as a percent of row length: $P_{row} = 1 - (A_{row} - V_{left})/(V_{right} - V_{left})$ The trial code, $CTrial_{row}$, is $P_{row}*15$ rounded to the nearest integer.

It was found that for real images, this technique, while giving a good approximation of the edge position, could be improved by calculating the color of the pixel containing the trial edge position for the three cases of the trial edge position and its two neighbors. The final edge position was then taken to be whichever of the three cases gave a pixel color closest to the input value.

If after the second pass some pixels were allocated to cluster X then the block has at least three colors. The strategy is to try to represent the block with the three-color encoding. The three-color encoding can fail either because there are more than three colors or because the colors have a geometric configuration that does not match the encoding. When the three color encoding fails, the method will use a three color encoding that is geometrically closest to the uncoded block.

The check for a valid geometric configuration and the construction of the encoded pixel can be combined into a single operation. For each row of the block extract the bit configurations from the A bitmap and from the B bitmap. Use these bitmap segments as indices into Table 5 to obtain a contribution to the code for the row. The sum of the left-bitmap contribution and the right-bitmap contribution gives the full code for the row. If either bitmap leads to any of the "void" table entries for any of the rows, then the block cannot be represented by this encoding. The test can be performed with the bitmap for cluster A as the left-bitmap and that for cluster B as the right bitmap. If this fails the order of the bitmaps can be exchanged and the test repeated. This process can be repeated with the rows of the block replaced by its columns to see if there is a horizontal three-color pattern.

Upon the successful completion of the test one has the four codes describing the four rows of the block. To complete the encoding one needs to do a search/insert into the three-color table to obtain the index to an entry containing the three colors for the block. These colors are the

TABLE 5

| BITMAP | LEFT CONTRIBUTION | RIGHT CONTRIBUTION |
|---|---|---|
| 0 | 0 | 0 |
| 1 | Void | 1 |
| 2 | Void | Void |
| 3 | Void | 2 |
| 4 | Void | Void |
| 5 | Void | Void |
| 6 | Void | Void |
| 7 | Void | 3 |
| 8 | 5 | Void |
| 9 | Void | Void |
| 10 | Void | Void |
| 11 | Void | Void |
| 12 | 9 | Void |
| 13 | Void | Void |
| 14 | 12 | Void |
| 15 | 14 | 4 | average colors for the three clusters, A, B and X. Their order (A X B or B X A) depends on whether the successful test used the bitmap for A as the left bitmap or the right bitmap.

Finally there is the case where the three-color encoding fails in which case one can use the full-cluster encoding, or if strict compaction is required, a geometrically close three-color encoding.

The following pseudo code gives an overview of the compression process:

```
Given: t_single    The one color threshold
       t_2-color   The two color threshold
       t_3-color   The three color threshold
for each 4 x 4 block in the input image
    Make a pass through block to determine C_a, C_b - the two most
    distant colors in the block, and d_ab the distance between them.
    if (d_ab < t_single) then
        Encode block as Single Color.
    else
        for each pixel C_i in the block
            compute d_ia and d_ib, the distances from C_i to C_a and C_b
            respectively.
            If (d_ia + d_ib > t_3-color) then
                assign C_i to the third cluster X
            else
                if (d_ia < d_ib)
                    assign C_i to first cluster A
                else
                    assign C_i to second cluster B
                fi
            fi
            adjust MaxD_ia and MaxD_ib accordingly
        hcaerof
        if cluster X is empty
            if (MaxD_ia < t_2-color and MaxD_ib < t_2-color)
                encode block as Two-Color.
            else
                if geometry correct for Hires Edge
                    encode block as Hires Edge
                else
                    encode block as Two-Color
                fi
            fi
        else
            if geometry correct for Three Color Edge
                encode as Three Color Edge
            else
                encode as Three Color Edge with minimum error
            fi
        fi
    fi
hcaerof
```

Decoding

During the marking process, the blocks of the image buffer must be decoded and expanded to full resolution. One has to examine the tag to determine which encoding is used for a block. One must then decode the block. A description of the decoding for each of the four representations follows.

The simplest case is the single color encoding. In this case the color value is replicated for the sixteen pixels of the block.

The two-color encoding requires accessing the color table to extract the two colors. The selection between the two colors is then controlled by the bitmap.

The decompression of the edge-encoding also begins by finding two colors in the color table. If it is a mostly vertical edge one must then reconstruct the rows of the block. For a mostly horizontal edge the columns must be reconstructed. Each row (or column) is described by a 4-bit edge placement code. A table look-up on the code can provide the proportions of each color to use for each pixel (see Table 6).

TABLE 6

| CODE | PIXEL 1 | PIXEL 2 | PIXEL 3 | PIXEL 4 |
|---|---|---|---|---|
| 0 | B | B | B | B |
| 1 | 4/15A + 11/15B | B | B | B |
| 2 | 8/15A + 7/15B | B | B | B |
| 3 | 12/15A + 3/15B | B | B | B |
| 4 | A | 1/15A + 14/15B | B | B |
| 5 | A | 5/15A + 10/15B | B | B |
| 6 | A | 9/15A + 6/15B | B | B |
| 7 | A | 13/15A + 2/15B | B | B |
| 8 | A | A | 2/15A + 13/15B | B |
| 9 | A | A | 6/15A + 9/15B | B |
| 10 | A | A | 10/15A + 5/15B | B |
| 11 | A | A | 14/15A + 1/15B | B |
| 12 | A | A | A | 3/15A + 12/15B |
| 13 | A | A | A | 7/15A + 8/15B |
| 14 | A | A | A | 11/15A + 4/15B |
| 15 | A | A | A | A |

The three color encoding also has codes for reconstruction of each row of the block. Again one begins with a color table look-up, in this case, to get the three colors of the block (left, middle and right). Then for each row the code can be used to access a table which indicates which pixels should get which colors. Table 7 provides three 4-bit bitmaps controlling

TABLE 7

| INDEX | LEFT BITMAP | MIDDLE BITMAP | RIGHT BITMAP |
| --- | --- | --- | --- |
| 0 | 0 | 15 | 0 |
| 1 | 0 | 14 | 1 |
| 2 | 0 | 12 | 3 |
| 3 | 0 | 8 | 7 |
| 4 | 0 | 0 | 15 |
| 5 | 8 | 7 | 0 |
| 6 | 8 | 6 | 1 |
| 7 | 8 | 4 | 3 |
| 8 | 8 | 0 | 7 |
| 9 | 12 | 3 | 0 |
| 10 | 12 | 2 | 1 |
| 11 | 12 | 0 | 3 |
| 12 | 14 | 1 | 0 |
| 13 | 14 | 0 | 1 |
| 14 | 15 | 0 | 0 |
| 15 | * | * | * | the left color, middle color, and right color of a row. For each bitmap, a 1 in any bit position indicates that the corresponding pixel in the row should be set to the respective color. A similar method is used for the blocks with horizontal three-color patterns, only the bitmap in the table provides the pattern of bits for a column rather than a row.

In recapitulation, the present invention employs a split-level image buffer. The present invention divides the page into small blocks which can be individually compressed and decompressed, allowing the page image to be constructed and modified in its compressed form. The present invention provides guaranteed printing while reducing the image buffer requirements by a factor of 16:1. It can also tag pixels as belonging to regions of fast or slow color change (object interiors or edges). The present invention provides descriptions of the encodings used as well as the algorithms for performing the encoding and decoding of images.

Figure 1:
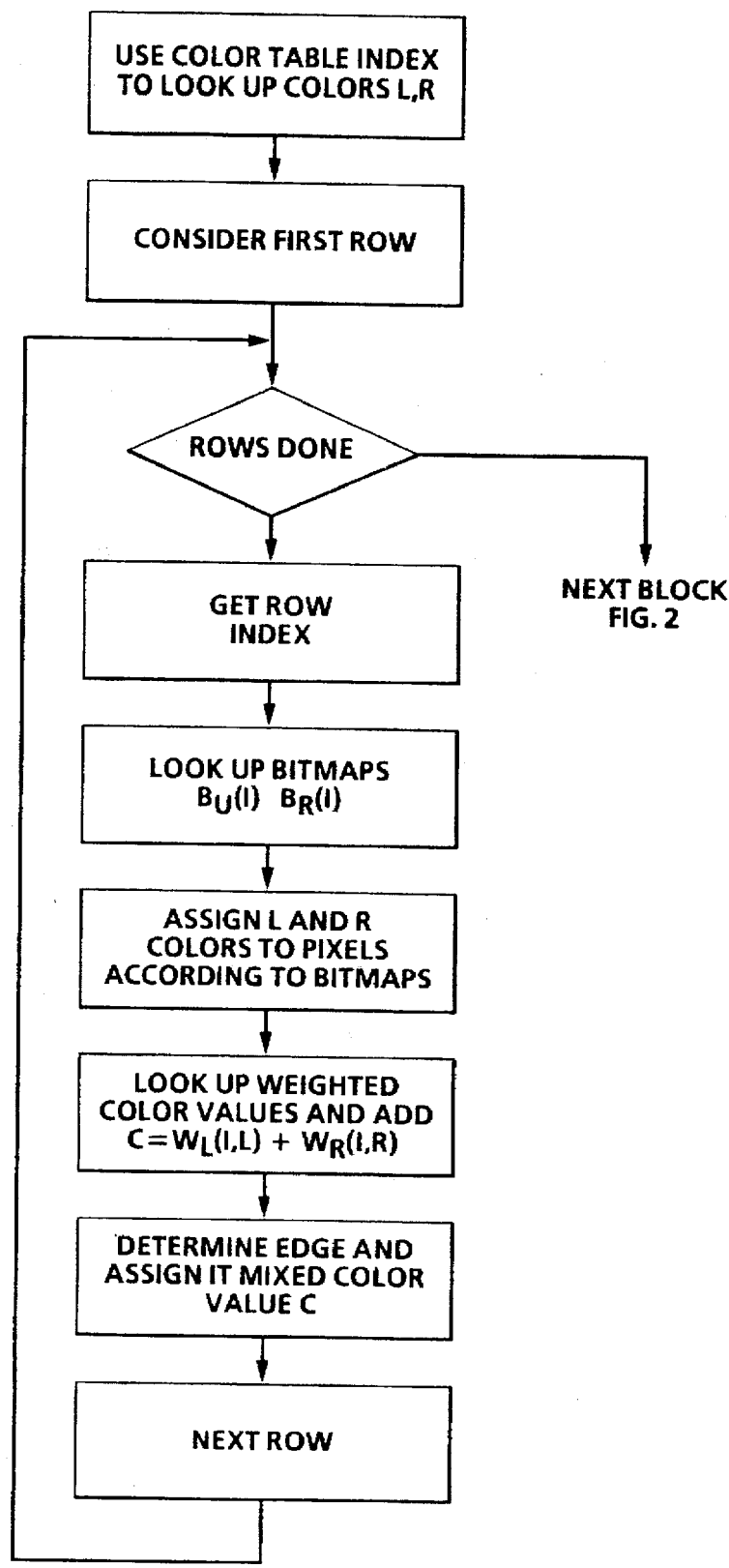
FIG. 1 is a flow chart of the decoding of a two-color block.
Figure 2:
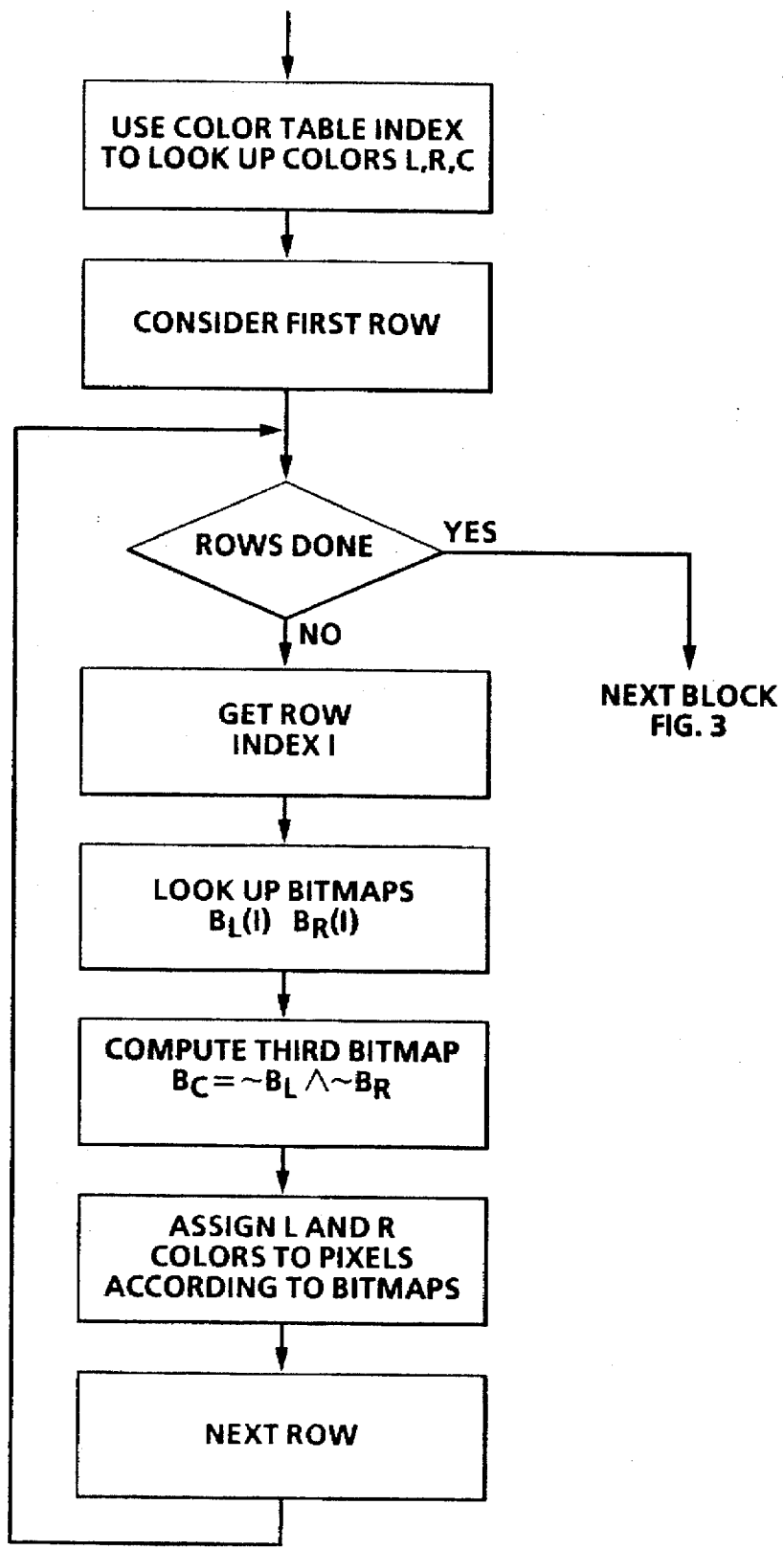
FIG. 2 is a flow chart of the decoding of a three-color block.
Figure 3:
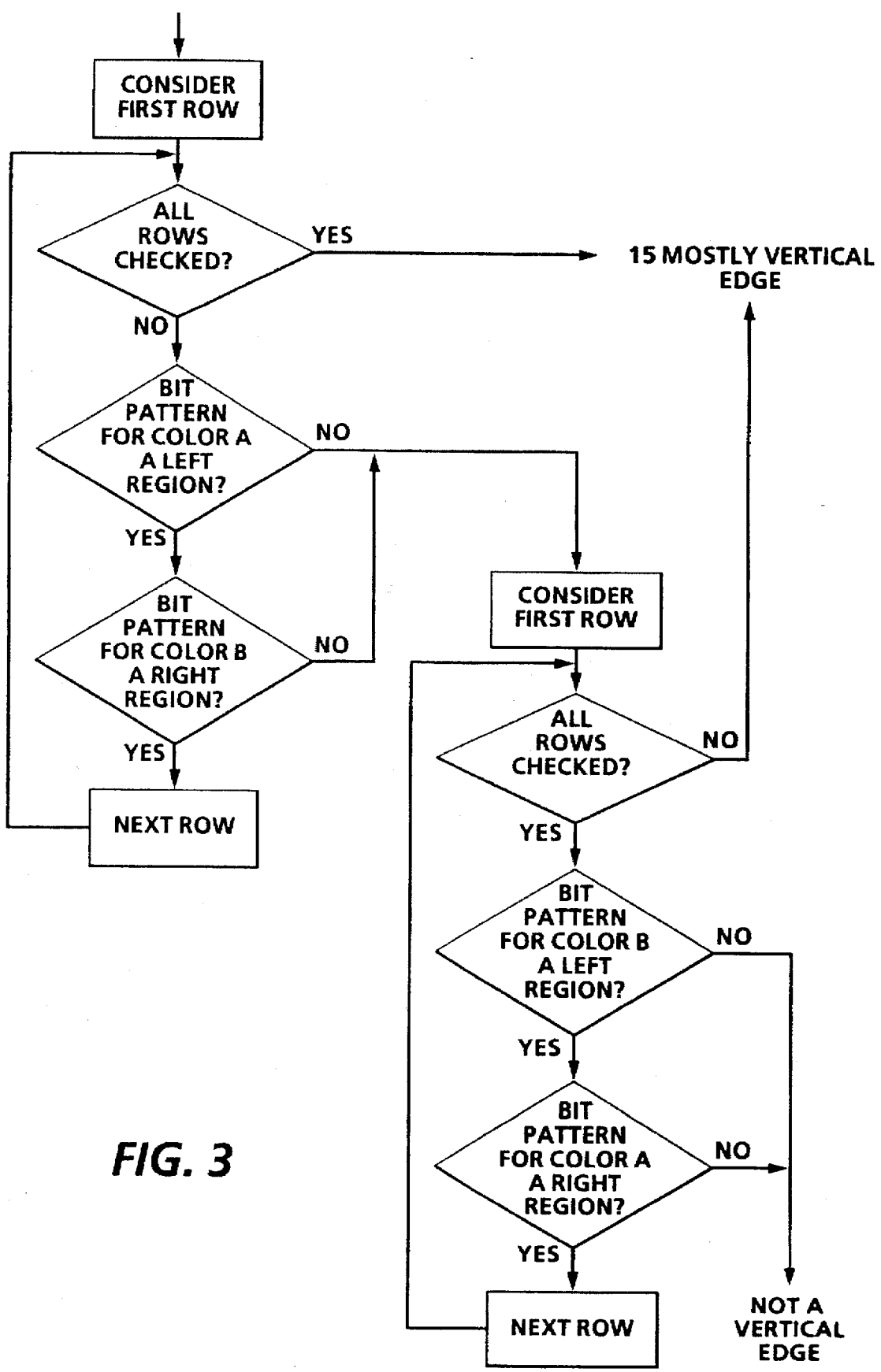
FIG. 3 is a flow chart of the test for a mostly vertical edge.
Figure 4:
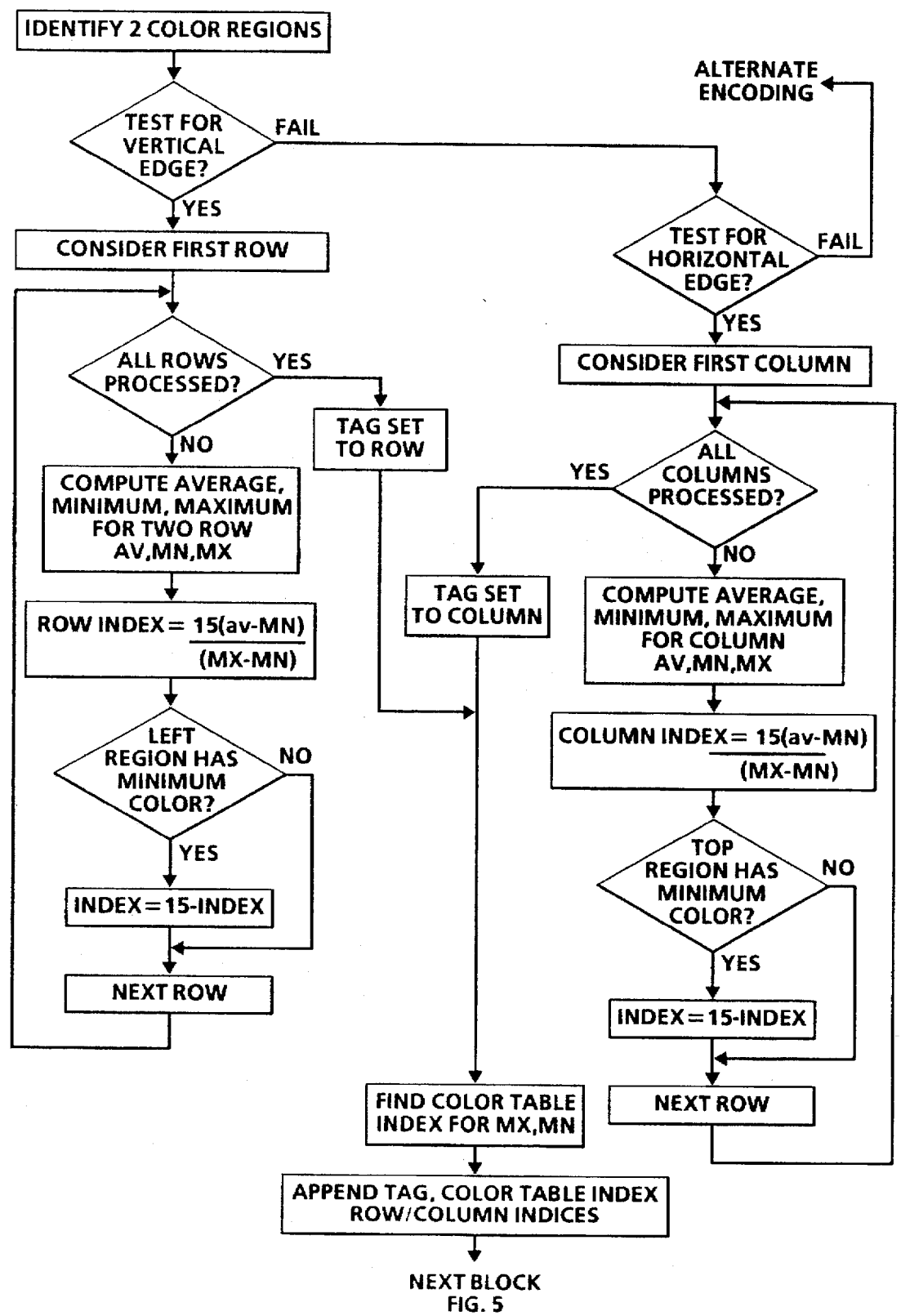
FIG. 4 is a flow chart of the encoding process for a two-color-edge block.

Referring to FIGS. 1–6, in particular FIGS. 3 and 4, one aspect of the invention is to use three shades for the block, the two representative shades and their average. The average value is then used for pixels on the boundary between the two high-contrast regions. However in a scanned image the shade of the pixel through which an edge between two regions passes is rarely the average of the two region's shades. It can take on any value between the two shades depending upon just how the edge divides it, and will only have the average shade if the edge happens to divide the pixel into two equal portions.

This invention describes an alternative encoding which improves the image quality by allowing each pixel through which an edge passes to take on any of several shades formed from the shades of the two regions ($S_1$ and $S_2$). The shade of an edge pixel can be $S_e=ZS_1+(1-Z)S_2$ where Z depends on the position of the edge. There are intermediate shades available in this encoding that are not available in the three shade case. This is done by specifying the edge position instead of specifying the color of each pixel. Consider the case of a mostly vertical edge passing through a 4×4 cell. Then one can specify where that edge crosses each row of pixels. If four bits are allocated to each of the four rows then the edge can be placed at any one of 16 positions on a row (to within a quarter pixel) and only 16 bits are needed to describe the edge position at all four rows of the block. Note, however that one must consider both the "mostly vertical" and "mostly horizontal" edge cases. The mostly vertical case should be handled by specifying the horizontal edge position within a row while the mostly horizontal case should give the vertical edge position within a column. Thus two versions of the encoding are needed and an additional bit per block is required to differentiate them.

The encoding is then the two representative region shades, the four 4-bit edge positions and a bit to distinguish the mostly vertical edge case from the mostly horizontal edge case.

For this encoding one must not only know what the two shades are but also which shade is on the left (bottom) and which is on the right (top). This may or may not require an additional bit of information for a block over the simple two-shade case depending upon how the shades are specified.

There is a complication with this scheme which arises because four bits only specify 16 positions when one would really like to specify 17. One would like to split each pixel of a row into four equal sections, 16 sections in all. But this yields 17 split positions, 15 interior to the row and the two end positions.

One can use the most significant two bits of the edge position code (i) to indicate which pixels contains the edge. If one then uses the least significant two bits to indicate the position of the edge within a pixel, the calculations are very simple and edge positions align with pixel boundaries. But because of the lack of a 17th position, one cannot specify a row in which every pixel is set to the left shade. The right-most specifiable edge position indicates a right pixel that is ¾ left shade and ¼ right shade. If this is acceptable then the decoding is very simple. However, one would probably prefer to be able to specify entire rows in either the left shade or the right shade because there may be edges that cross a corner of the block and miss entire rows completely. A more uniform approach is to divide the row into 15 sectors giving 16 positions. If this is done the Z value is different at every position.

An efficient implementation of a decoding method for this approach is possible in spite of the varied fractions with denominators that are not powers of 2. Referring to FIG. 1, the idea is to store the products of the Z values and intensity values in a table. The index to the table would be formed by concatenating the position code (4-bits) to the intensity value (8-bits or less) giving a 12-bit index to a 4096 entry table. The table contains the product of the intensity value and the Z value corresponding to the position code. For example if the intensity were 60 and the position were 3 the concatenated index would be 3×256+60=828. The table entry at 828 would contain the product of the Z value for this position (8/15) and the shade (60) which is 32.

The contribution from the second shade can be obtained using the same table by forming an index from the complement of the position code and the intensity value for the shade. The final shade value for the edge pixel is just the sum of the contributions from the two table look-ups. The pixel that should receive this shade value is still given by the two high-order bits of the position code. Pixels to the left of this position in the row should have the left shade intensity $S_1$ and pixels to the right should be given shade $S_2$. Decoding the mostly horizontal case is similar except columns are analyzed Instead of rows.

Figure 5:
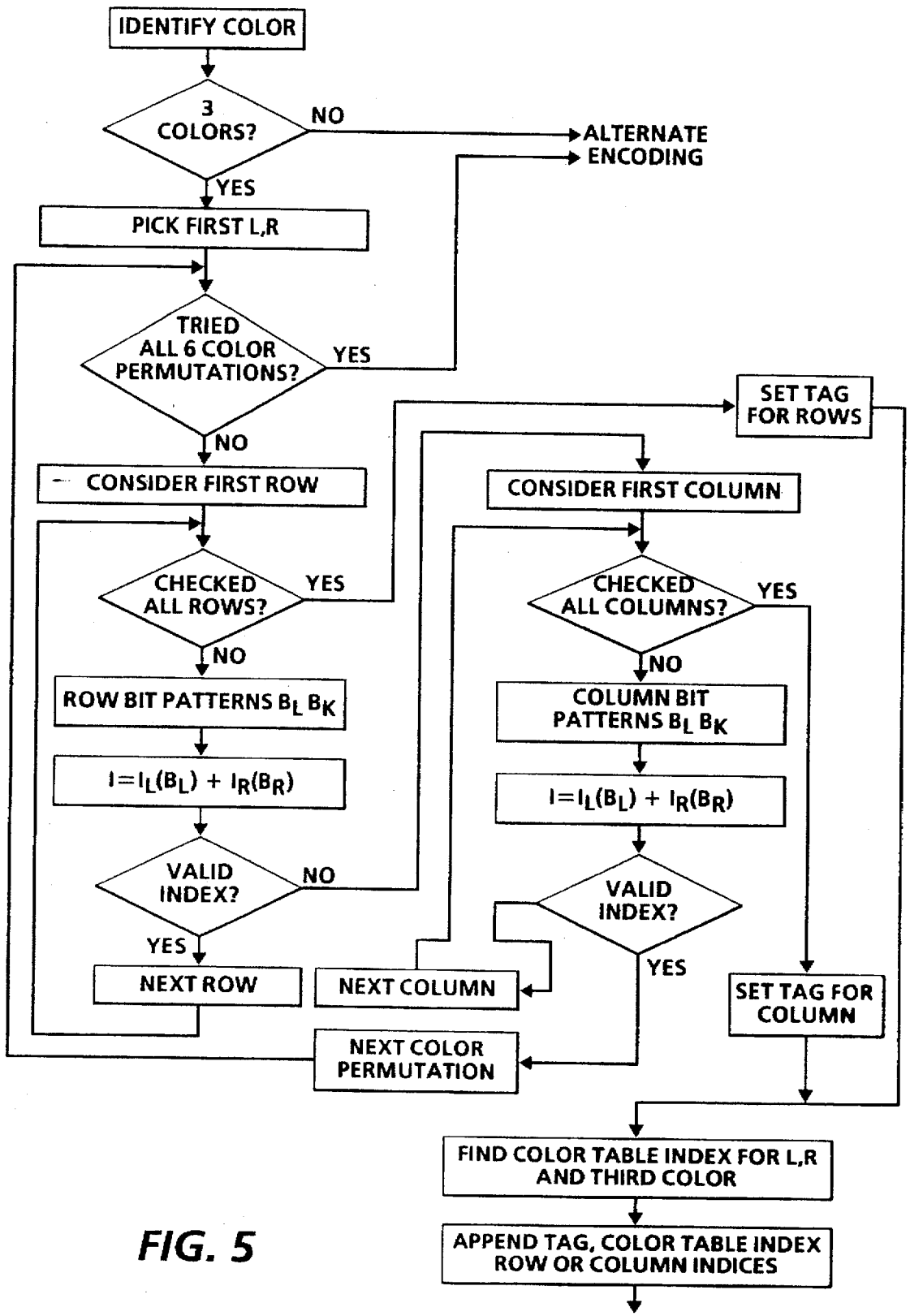
FIG. 5 is a flow chart of the encoding process for a three-color-edge block.
Figure 6:
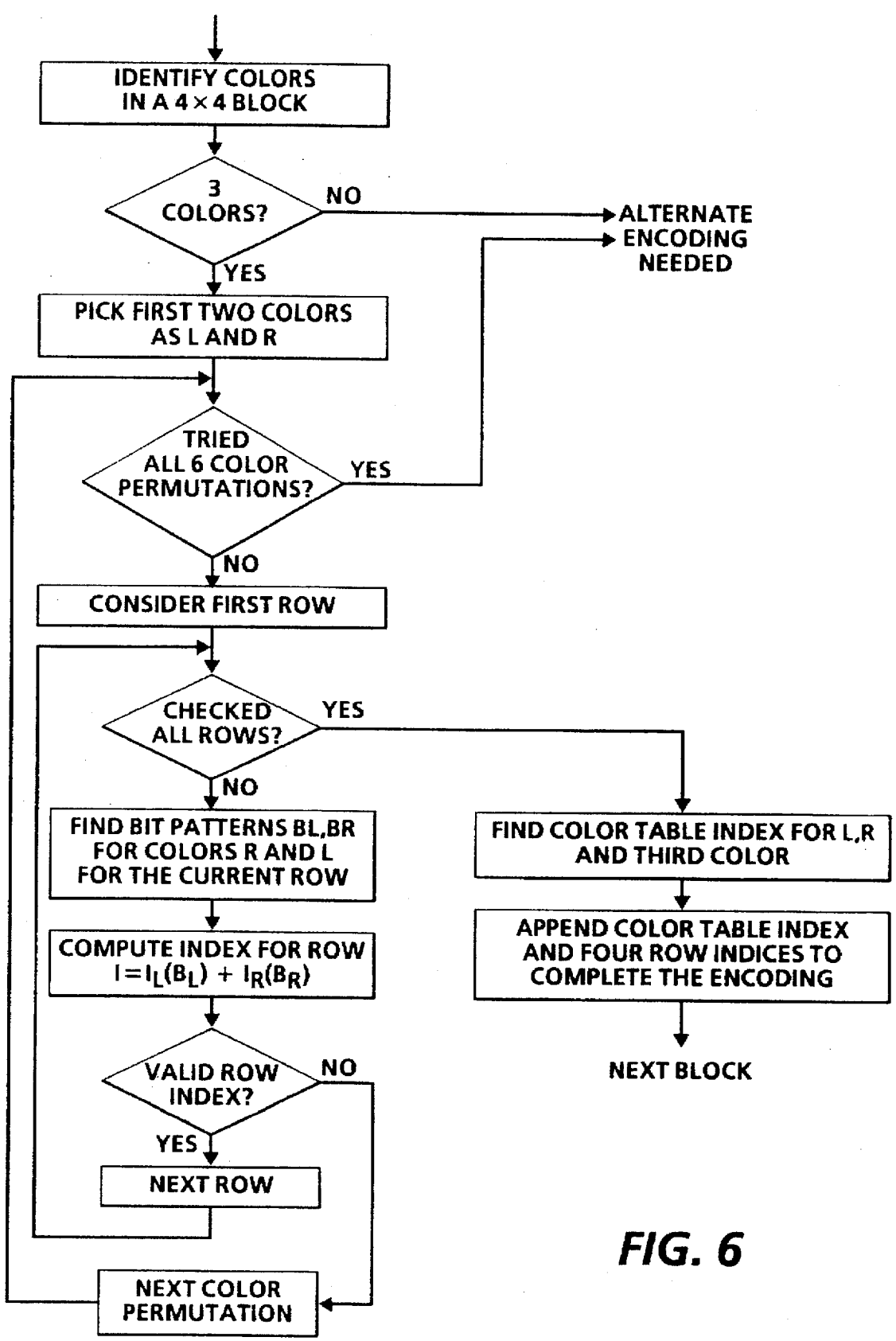
FIG. 6 is a flow chart of the encoding process for a three-color-vertical edge block.

Referring to FIGS. 2, 5 and 6, another aspect of the invention is to divide the 4×4 block into four rows (columns)

and specify each row separately with four bits of information. On each row (column) there can be M pixels of the left (top) shade followed by N pixels of the intermediate shade followed by the remaining pixels in the right (bottom) shade where M, N, and M+N can vary between 0 and 4. There are fifteen possible patterns for a row. Thus the table index for a row (column) pattern can be encoded in 4 bits and the pattern for the entire block can be described by 16 bits. The block can therefore be described by the two representative shades and the four 4-bit indices to the table of row (column) patterns. Note, however, that for this encoding the order of two shades is important. One cannot specify shades by just their mean and offset, but must also tell whether the left (top) shade is the darker or lighter. Depending on how the colors are specified, this may or may not cost an additional bit per block over the storage needed for the two-color case.

Conversion between this three shade encoding and more conventional bitmaps can be carried out easily and efficiently. For decompression one is given the table indices for the four rows (columns) and may wish to derive a bitmap for any one of the three colors. This can be done for any row (column) with a look-up in a 15 element table. Note that a 16-element table could also be defined with a unused last entry. For efficiency one might determine the bitmap for two rows (columns) at once by a look-up of two concatenated indexes in a 256 entry table. The bitmap for the entire block can then be obtained by ORing together the results of two table look-ups. Note that this is just the bitmap for one of the shades. For the placement of a second shade one must do a similar calculation using a different set of tables. The bitmap for the third shade can be calculated as the negation of the disjunction of the other two bitmaps.

When compressing one is given the bitmaps for the two representative shades and must determine the corresponding table index. This can be done by using the row (column) bitmap as an index into a table where one can obtain a contribution to the index. The sum of the left-(top)-bitmap contribution and the right- (bottom-) bitmap contribution gives the full index for the row. If the bitmap leads to any of the "void" table entries then the pattern cannot be represented by this encoding.

It is therefore apparent, that there has been provided a method for encoding and decoding images in accordance with the present invention, that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method of encoding an image at full resolution for storing in a reduced image buffer for subsequent decoding and printing by a marking device, the method comprising the steps of:

dividing the image into a plurality of blocks wherein each block is comprised of a plurality of pixels;

identifying a number of color regions present in each of said plurality of blocks;

selecting a predefined encoding process from a plurality of predefined encoding processes for each of said plurality of blocks according to the number of color regions present in each of said plurality of blocks, said one of said plurality of predefined encoding process comprises the steps of:

distinguishing smooth areas for one of said plurality of blocks from edges of said one plurality of blocks;

determining a construction of the edges in one of said plurality of the blocks; and storing the construction in the reduced image buffer; and storing said encoded plurality of blocks in said reduced image buffer for subsequent decoding and printing by the marking device.

2. A method according to claim 1, wherein said one of said plurality of predefined encoding process comprises the steps of:

employing a pointer to a list of color values; and assigning one color value for each pixel of the block wherein the color value being the color of the pixel of the block.

3. A method according to claim 2, further comprising storing the pointer and a tag to distinguish the type of encoding.

4. A method according to claim 1, wherein said determining step further comprises step of dividing the block into rows and columns of pixels.

5. A method according to claim 4, wherein said determining step comprises describing an edge for one of said plurality of the blocks by storing positions of edge pixels at which the edge enters and exits the rows and columns of pixels within the block.

6. A method according to claim 5, wherein said determining step comprises steps of:

describing an edge for one of said plurality of the blocks as being composed of either a mostly vertical or mostly horizontal edge;

selecting either mostly vertical edge coding or mostly horizontal edge coding based upon said describing step;

dividing the one of said plurality of the blocks into two clusters of pixels based upon their shade; and specifying a shade for each pixel.

7. A method according to claim 6, wherein said specifying step comprises determining a shade for the edge pixels.

8. A method according to claim 7, wherein said determining step comprises selecting as the edge position value for an edge-containing pixel the position value available to that pixel that upon decoding gives a value closest to the true pixel value.

9. A method according to claim 7, wherein the shade for the edge at each position is selected by the following equation:

$$S_e = ZS_1 + (1-Z)S_2$$

Where $S_e$ is the shade of an edge pixel, Z is the position of the edge pixel, $S_1$ is the shade of one cluster and $S_2$ is the shade of the another cluster.

10. A method according to claim 9, wherein said determining step further comprises the step of providing a tag and a color table index.

11. The method according to claim 5, further comprising quantizing the number of available positions for an edge within a row or column to 16.

12. The method according to claim 10, further comprising using a 4-bit entry to describe the edge position in a column or row.

13. A method according to claim 2, wherein said one of said plurality of predefined encoding processes comprises representing each pixel of the block as a single color value.

14. A method according to claim 1, wherein said one of said plurality of predefined encoding processes comprises describing the block as containing only two colors.

15. A method according to claim 14, further comprising employing an index into a table of color pairs to indicate the two colors of the block.

16. A method according to claim 14, further comprising employing a bitmap to indicate the correspondence between the two colors and the pixels of the block.

17. A method according to claim 14, further comprising employing a tag to distinguish the block as containing only two colors.

18. A method according to claim 16, wherein the employing step comprises providing a bitmap having one bit per pixel of the block.

19. A method according to claim 18, wherein the providing step comprises assigning that a 0 bit value indicates a first color value is associated with the pixel and a 1 bit value indicates a second color value being associated with the pixel.

20. A method according to claim 1, wherein said one of said plurality of predefined encoding processes comprises describing the block as containing only three colors.

21. The method according to claim 20, wherein said describing step comprises identifying a row of pixels as being composed a predefined run length combination of colors which occur in the same order.

22. The method according to claim 20, wherein said describing step comprises identifying a column of pixel as being composed of a predefined run length combination of colors which occur in the same order.

23. A method according to claim 21, wherein said describing step further comprises providing a tag, a color table index of color triples and a run index which specifies the run length combination of three colors.

24. A method according to claim 22, wherein said describing step further comprises providing a tag, a color table index of color triples and a run index which specifies the run length combination of three colors.

25. A method according to claim 23, further comprising storing the tag, the run index and the color table index using a 4-bit code.

26. A method according to claim 24, further comprising storing the tag, the run index and the color table index using a 4-bit code.

* * * * *